E. T. MUG.
DYNAMO ELECTRIC MACHINE.
APPLICATION FILED NOV. 17, 1905.
908,484.
Patented Jan. 5, 1909.
2 SHEETS—SHEET 1.
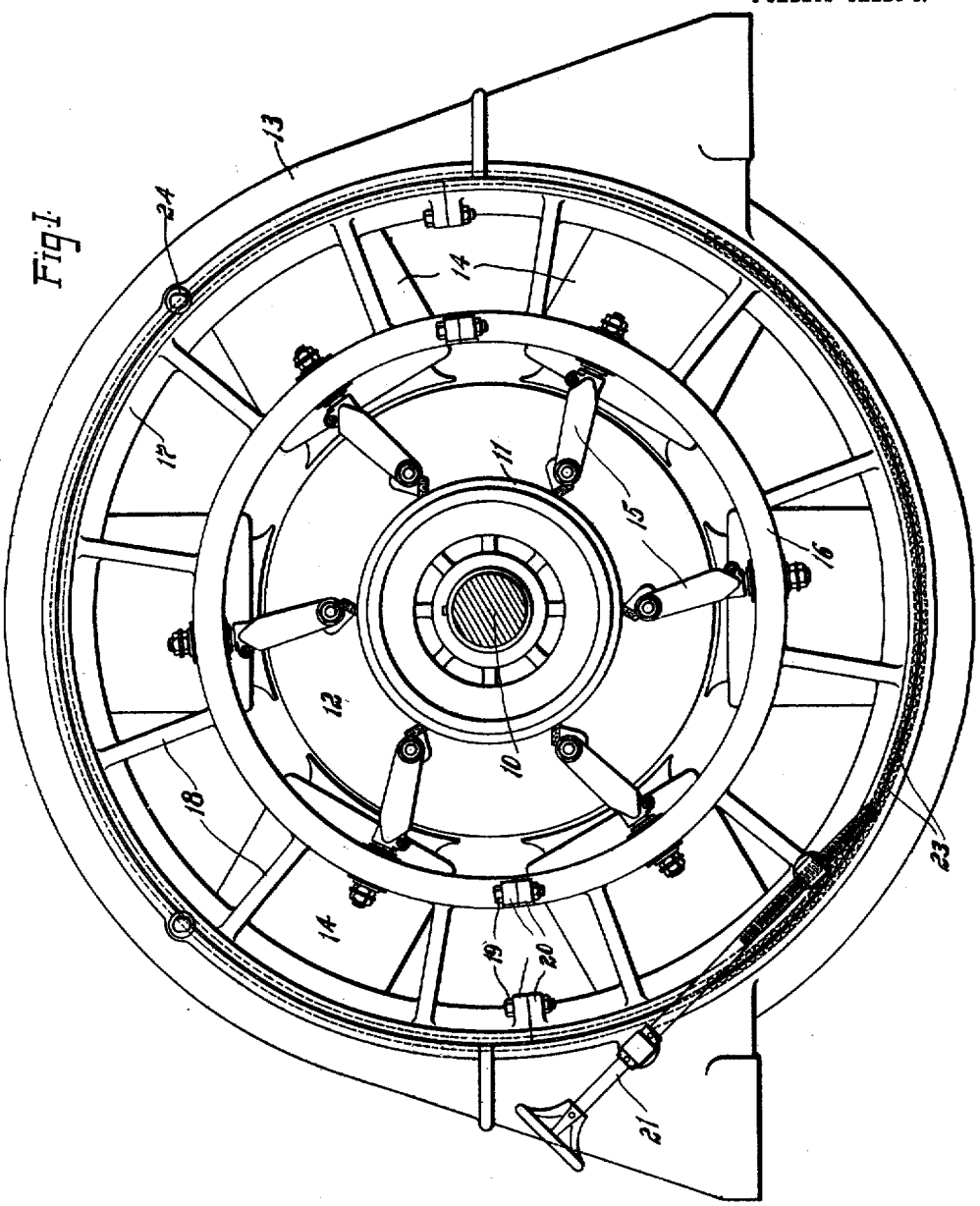
WITNESSES:
George J. Schwartz
Fred J. Kinsey
INVENTOR:
Edward T. Mug.
By
Chas. E. Lord
ATTORNEY.

E. T. MUG.
DYNAMO ELECTRIC MACHINE.
APPLICATION FILED NOV. 17, 1905.
908,484.
Patented Jan. 5, 1909.
2 SHEETS—SHEET 2.
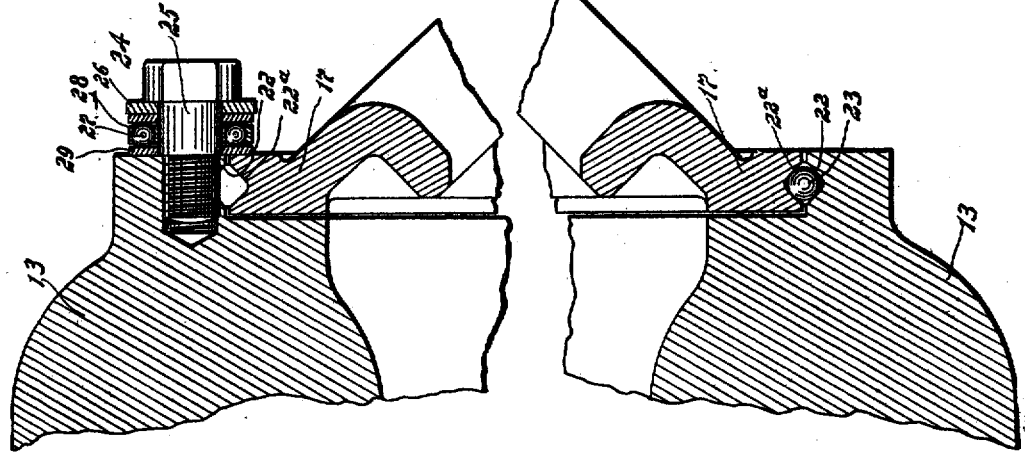
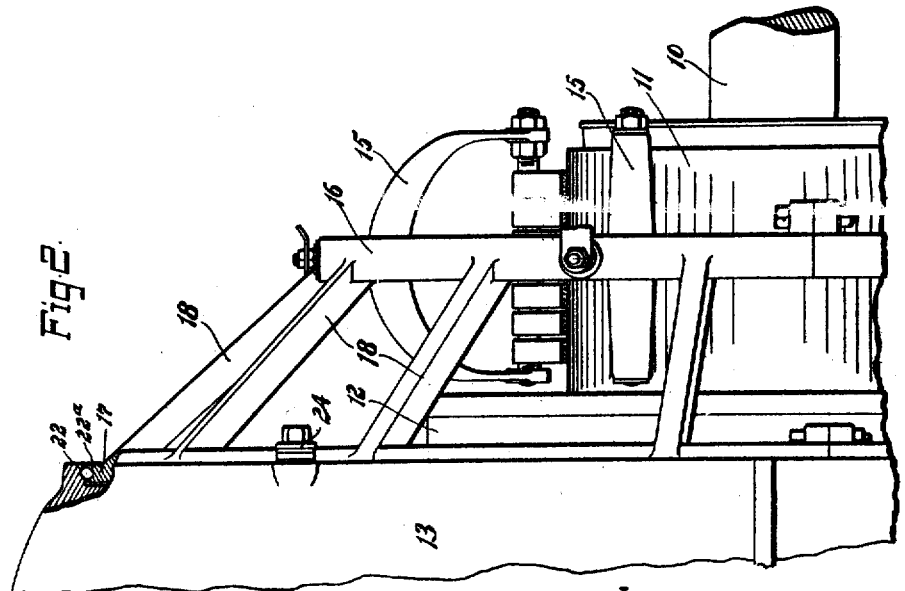
WITNESSES:
George J. Schwartz
Fred J. Kinsey
INVENTOR:
Edward T. Mug.
By
Chas. E. Lord
ATTORNEY.

UNITED STATES PATENT OFFICE.

EDWARD T. MUG, OF NORWOOD, OHIO, ASSIGNOR TO THE BULLOCK ELECTRIC MANUFACTURING COMPANY, A CORPORATION OF OHIO.

DYNAMO-ELECTRIC MACHINE.

No. 908,484.  Specification of Letters Patent.  Patented Jan. 5, 1909.

Application filed November 17, 1905. Serial No. 287,83'.

*To all whom it may concern:*

Be it known that I, EDWARD T. MUG, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines, and particularly to the brush-rigging for large multipole direct current machines. In a usual construction of such machines, the brush forks are supported on a brush yoke which is mounted on the end of the field frame. Usually a recess is provided in the end of the field frame and the brush yoke is seated closely therein, and is so held that it can only be moved circumferentially to adjust the position of the brushes.

In large direct current machines, the brush yokes are very heavy and difficult to adjust on account of the great friction between the engaging faces of the yoke and frame, the friction being due not only to the downward thrust of the ring, but also to the side thrust. The field frames of all large machines are divided into at least two parts, and the brush yokes are also each divided into two parts. In assembling the parts of a machine, the upper half of the frame is lowered onto the lower half. It would be an easy matter to provide ordinary anti-friction ball bearings between the engaging faces of the lower half of the brush yoke, but it would be difficult, if not impossible, to provide anti-friction bearing between the engaging surfaces of the upper portions of the frame and yoke for the reason that there is no means for inserting the balls in the groove, and for maintaining them in position while the upper half of the frame and yoke is being lowered onto the lower half. If the lower portions only of the frame and yoke were provided with anti-friction bearings, the friction due to the downward thrust would be lessened, but the friction in the upper half due to the side thrust of the yoke would still exist.

It is the object of my invention to provide anti-friction bearings for both the upper and lower halves of the brush yoke. With this end in view I provide anti-friction roller bearings between the adjacent faces of the lower half of the frame and yoke, and provide anti-friction side thrust bearings for the upper half of the frame and yoke, whereby the yoke can be easily and quickly adjusted when desired.

My invention further consists in certain novel details of construction and combinations of elements described in the specification and set forth in the appended claims.

Reference is had to the accompanying drawings, in which,

Figure 1 is an end view of a machine, the usual cross-connectors being removed for the sake of clearness, and the shaft being shown in section; Fig. 2 is an elevation of a portion of a machine, parts being broken away for the sake of clearness; Fig. 3 is a detail in section of a side thrust bearing in the upper part of the machine; and Fig. 4 is a detail in section of the bearing in the lower part of the machine.

Referring to the figures of the drawing, I have shown at 10 a shaft of a dynamo-electric machine, on which is mounted the commutator 11 and armature 12. The surrounding field frame is shown at 13. As in the usual construction, the field frame is divided into two portions approximately on a horizontal plane through the center of the shaft. Integral with the field frame are the radial field poles 14.

The brush forks 15, arranged at intervals around the commutator, are supported in the inner ring 16 of the brush yoke, which consists of the inner ring, outer ring 17 and downwardly and outwardly extending arms 18. The outer ring 17 is seated in a recess provided at the end of the field frame adjacent the commutator. The brush yoke is divided into halves which are held together by bolts 19 passing through lugs 20 on the two portions of the yoke. An adjusting screw 21 is provided, as is customary, for adjusting the position of the yoke circumferentially.

As usually constructed, the yoke fits closely in the recess on the end of the field frame, and usually a ring is bolted to the face of the frame, which ring engages also the outer surface of the brush yoke, and thus prevents a movement in an end-wise direction. It has been found, that, in the machines so constructed, it is very difficult to adjust the brush rings. It is sometimes desirable to adjust the brush rings very quickly to avoid injury to the brushes and commutator on account of sparking, but this heretofore could not be done on account of the great friction between the engaging surfaces of the yoke and the frame, due to the downward thrust of the yoke in the lower half of the machine, and to the side thrust in the upper half of the machine.

To lessen the friction due to the downward and side thrusts of the yoke I provide antifriction bearings of the following construction: V-shaped grooves 22 and 22ª are formed in the adjacent circumferential surfaces of both the frame and the yoke, the grooves preferably extending entirely around both members. Before the upper half of the frame is bolted to the lower half, I insert in the grooves 22 and 22ª between the adjacent surfaces of the yoke and the frame, a large number of anti-friction roller bearings 23. I prefer to use ball bearings in order that both the side thrust and the lower thrust of this half of the machine can be guarded against.

As the parts of the machine are usually large and heavy, the upper half of the frame is lowered and placed on to the lower half by means of a crane and is then bolted into position. It will be seen therefore that it is nearly impossible to provide ball bearings in the grooves of the upper halves of the yoke and frame, for the reason that they could not be inserted, and if they were inserted it would be a very difficult matter to retain them in the grooves while the upper and lower halves of the frame were being assembled. As there is only a side thrust to be guarded against in the upper half of the machine, I mount on the ends of the upper half of the field frame, a plurality of standard side thrust collars 24 against which the upper portion of the yoke bears. Each side thrust bearing consists of an axial bolt 25, a washer 26, a plurality of ball bearings 27 which is surrounded by collar 28, and a movable washer 29 which engages on the one side the ball bearing, and on the other side the end surfaces of the field frame and the brush yoke. I have in Fig. 1 shown only two of such thrust collars, but it is evident that more than this number may be employed if desired. Also under certain circumstances a single thrust collar might be sufficient.

I have shown and described a machine having a brush yoke at one end only, but I do not wish to be confined to this type of a machine. In case the machine is provided with two commutators, each end of the field frame would be provided with a brush yoke supported in the manner described above.

It is seen that the construction is simple and that the parts can be easily assembled, and can be taken apart by first removing the side thrust bearings and unbolting the two parts of the yoke, after which both parts of the yoke can be removed. It will be also seen that on account of the anti-friction bearings provided friction will be lessened to a considerable degree and the yoke can be easily adjusted when desired.

I aim in my claims to cover all modifications which do not involve a departure from the spirit and scope of my invention.

What I claim as new and desire to secure by Letters Patent is:—

1. In a dynamo-electric machine, a field frame, a brush yoke, roller bearings for the lower portion of the yoke, and side-thrust roller bearings for the upper portion of the yoke, said side thrust bearings engaging the outer face of the yoke.

2. In a dynamo-electric machine, a field frame, a brush yoke, said frame having a recessed portion in which the yoke is seated, roller bearings between the adjacent surfaces of the frame and yoke in the lower portion of the machine, and side-thrust roller bearings for said yoke in the upper portion of the machine, and engaging the outer face of the yoke.

3. In a dynamo-electric machine, a field frame, a brush yoke, said frame having a recessed portion in which the yoke is seated, roller bearings between the yoke and the lower portion of the frame, and side-thrust roller bearings for the yoke mounted on the end of the field frame.

4. In a dynamo-electric machine, a field frame having a recessed portion at the end, a brush yoke comprising a ring seated in said recess, grooves in the adjacent circumferential faces of the frame and yoke, anti-friction roller bearings located in said grooves, and anti-friction side-thrust bearings engaging the outer face of the yoke.

5. In a dynamo-electric machine, a field frame having a circular recessed portion, a brush yoke comprising a ring seated in the recess, said adjacent circumferential surfaces of the frame and yoke having grooves, anti-friction ball bearings seated in the grooves in the lower portion of the machine, and separate side-thrust anti-friction bearings for the upper portion of the yoke secured at intervals to the field frame.

6. In a dynamo-electric machine, a field member having a circular recessed portion at one end thereof, said field member consisting of two portions bolted together, a brush yoke seated in said recess, said yoke consisting of two portions bolted together, the adjacent circumferential surfaces having V-shaped grooves, anti-friction ball bearings in said grooves in the lower portion of the frame and yoke, and a plurality of anti-friction side-thrust bearings for the upper portion of the yoke, said thrust bearings being bolted to the end of the upper portion of the field frame at a number of spaced points.

7. In a dynamo electric machine, a field frame having a circular recessed portion, a brush yoke seated in the recess, the adjacent circumferential surfaces of the frame and yoke having grooves, anti-friction ball bearings seated in the grooves at the lower portion of the machine only, and anti-friction side thrust bearing devices for the upper portion of the yoke, said devices comprising axial bolts extending into the end of the field frame and a ball retainer and ball bearings surrounding each of the bolts.

In testimony whereof I affix my signature, in the presence of two witnesses.

EDWARD T. MUG.

Witnesses:
FRED J. KINSEY,
ARTHUR F. KEVIS.

Corrections in Letters Patent No. 908,484.

It is hereby certified that in Letters Patent No. 908,484, granted January 5, 1909, upon the application of Edward T. Mug, of Norwood, Ohio, for an improvement in "Dynamo-Electric Machines," errors appear in the printed specification requiring correction, as follows: In line 107, page 2, the word "the" should read *said*, and in line 108, same page, the word "said" should read *the;* and that the said Letters Patent should be read with these corrections therein that the same may conform to the record of the case in the Patent Office.

Signed and sealed this 26th day of January, A. D., 1909.

[SEAL.]

C. C. BILLINGS,
*Acting Commissioner of Patents.*